United States Patent
Sanampudi et al.

(10) Patent No.: US 7,814,196 B1
(45) Date of Patent: Oct. 12, 2010

(54) METHODS AND APPARATUS FOR MAPPING RESOURCES

(75) Inventors: Manohar Sanampudi, San Jose, CA (US); Sesh Jalagam, Santa Clara, CA (US); Keerthi Arutla, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 1233 days.

(21) Appl. No.: 11/391,106

(22) Filed: Mar. 28, 2006

(51) Int. Cl.
 G06F 15/173 (2006.01)
 G06F 13/00 (2006.01)

(52) U.S. Cl. .................. 709/224; 709/220; 709/228; 711/170

(58) Field of Classification Search ............... 709/224, 709/226, 228, 227; 707/9
 See application file for complete search history.

(56) References Cited

U.S. PATENT DOCUMENTS

| | | | |
|---|---|---|---|
| 6,754,718 B1 * | 6/2004 | Dobberpuhl et al. | 709/250 |
| 7,230,730 B2 * | 6/2007 | Owen et al. | 358/1.14 |
| 7,328,260 B1 * | 2/2008 | Muthiyan et al. | 709/224 |
| 2004/0199513 A1 * | 10/2004 | Dobberpuhl et al. | 707/9 |

* cited by examiner

*Primary Examiner*—Khanh Q Dinh
(74) *Attorney, Agent, or Firm*—Chapin IP Law, LLC; Barry W. Chapin, Esq.

(57) ABSTRACT

A mapping function deduces or attempts to deduce a type associated with the unknown type of storage area network resource based (at least in part) on functional capabilities or physical attributes associated with the unknown type of storage area network resource. If the mapping function is unable to map the unknown type of storage area network resource with a sufficient degree of certainty based on its physical attributes and/or retrieved configuration information, then the mapping function applies an algorithm that compares retrieved configuration information (such as a data string received from and) associated with the unknown type of storage area network resource to respective configuration information (e.g., data strings) associated with the known types of storage area network resources. Longer matching sequences in the compared data strings indicate a higher likelihood that the unknown type of storage area network resource matches a respective known type of storage area network resource.

20 Claims, 13 Drawing Sheets

MAPPED RESOURCE INFO 160

| | MAPPED? (205-1) | COLLECTED INFO (205-2) | MAPPED TO (205-3) |
|---|---|---|---|
| SANR 120-5 | YES | LP9002 | LP9002L-E ▶ |
| SANR 120-4 | NO | HBA API v2.2 b ... | UNKNOWN ▶ |
| SANR 120-2 | NO | DS-1C9140-K9 | UNKNOWN ▶ ~250-3 |
| SANR 120-3 | YES | MS WINDOWS 2000 S.P 4 | MS WINDOWS 2000 S.P 4 ▶ |
| SANR 120-1 | YES | SYM DMX-3 | SYMMETRIX DMX-3002 |
| | ... | ... | ... |

| Display Name | Mapped | Mapped To | | | Snapshot Value | |
|---|---|---|---|---|---|---|
| d01col03 | | | | | | |
| UNIX Hosts | | | | | | |
| Windows Hosts | | | | | | |
| clntcpath02 | ✓ | Dell PowerEdge 2850 | | | Host: | Unknown |
| | ✓ | Microsoft Windows 2000 Server SP4 | | | OS: | Microsoft Windows 2000 Service Pack 4 |
| | ⚠ | Unknown | | | PowerPath: | Unknown |
| | ⚠ | Emulex LP9002-E (LP9001N-E) 1161 | | | HBA: | Emulex Corporation LP9002 |
| | ⚠ | SLI-2 SW_DATE:Mar 18 2005, v5-2.30a2; HBAAPI v2.2.b, 02-17-05 | | | driver: | SLI-2 SW_DATE:Mar 18 2005, v5-2.30a2; HBAAPI v2.2.b, 02-17-05 |
| | ✓ | 3.92a2 | | | firmware: | 3.92A2 |
| | ✓ | Emulex LP9002-E (LP9002L-E) | | | HBA: | Emulex Corporation LP9002 |
| | ⚠ | SLI-2 SW_DATE:Mar 18 2005, v5-2.30a2; HBAAPI v2.2.b, 02-17-05 | | | driver: | SLI-2 SW_DATE:Mar 18 2005, v5-2.30a2; HBAAPI v2.2.b, 02-17-05 |
| | ✓ | 3.92a2 | | | firmware: | 3.92A2 |

METHODS AND APPARATUS FOR MAPPING RESOURCES

RELATED APPLICATIONS

This application is related to: i) co-pending U.S. patent application entitled "METHODS AND APPARATUS FOR RENDERING MESSAGES," Ser. No. 11/390,899, filed on Mar. 28, 2006, ii) co-pending U.S. patent application entitled "METHODS AND APPARATUS ASSOCIATED WITH ADVISORY GENERATION," Ser. No. 11/391,012, filed on Mar. 28, 2006, and iii) co-pending U.S. patent application entitled "METHODS AND APPARATUS ASSOCIATED WITH ADVISORY GENERATION," Ser. No. 11/390,900, filed on Mar. 28, 2006, the entire teachings of which are incorporated herein by this reference.

BACKGROUND

In general, a so-called storage area network (SAN) is a collection of data storage systems that are networked via a switching fabric to a number of host computer systems operating as servers. The host computers (also known as servers) of a respective storage area network access data stored in respective data storage systems on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A respective infrastructure supporting access to data in a storage area network can be quite complex. For example, as discussed above, consider the number of hardware and software components that must work in harmony in order for a user to successfully access data stored in a storage array of a SAN. To access such data, a user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium of one or more switches (e.g., in a storage area network implementation) to a front-end adapter interface card resource operating on a high-capacity data storage array of the SAN. The front-end adapter interface card receives the I/O requests and interprets them to identify appropriate data locations within specific storage device resources contained in the storage array.

After the requested data is accessed from the storage devices, respective I/O responses are typically returned from the accessed storage system to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

If even a single resource such as a switch, operating system, host bus adapter, storage system, etc. in a respective storage area network is incompatible with other hardware and/or software resources present in the storage area network, then the storage area network may no longer operate properly and enable a respective user to retrieve stored data.

One conventional way to ensure that a storage area network will work properly (e.g., so that the storage area network enables users to access corresponding stored data) is to generate a set of interoperability rules indicating valid storage area network configurations and store the interoperability rules in a database. In general, the set of interoperability rules indicates which combination of different types of hardware and software resources are compatible with each other and can be used together in a respective storage area network. An administrator can manually review (e.g., apply) respective interoperability rules with respect to a current or proposed storage area network configuration to ensure that a respective configuration is acceptable prior to actual implementation. To apply such rules, the network administrator needs to know a type associated with each of the resources in the storage area network environment.

SUMMARY

Conventional applications that support management of a storage area network environment can suffer from a number of deficiencies. For example, as discussed above, management of a storage area network can be a challenge due to the complex network of resources that must be combined so that the storage area network operates properly for a multitude of different types of users. Application of a set of rules to validate a storage area network configuration requires proper knowledge of the types of resources in the storage area network. Unfortunately, a storage area network can include so many different types (e.g., manufacturer, model, hardware settings, software settings, etc.) of resources that it is often difficult to keep track of such information (e.g., resource types) and therefore render an assessment whether a respective storage area network configuration is acceptable.

One way to learn of a "type" associated with a respective storage area network resource is to communicate directly with the respective storage area network. In certain cases, response information originated by the respective storage area network resource can be used to confidently map the respective storage area network resource to a known type of storage area network resource. However, in many cases, the response information from a respective storage area network resource does not always include enough information to map the respective storage area network resource to a corresponding known type of storage area network resource with sufficient certainty.

Techniques discussed herein deviate with respect to conventional applications such as those discussed above as well as other techniques known in the prior art. For example, embodiments herein include techniques for mapping unknown types of storage area network resources to corresponding known types of storage area network resources.

More specifically, a mapping function according to an embodiment herein initially attempts to map (e.g., via so-called global mapping) a respective unknown storage area network resource directly to a known type of storage area network resource based merely on information retrieved from or associated with the unknown type of storage area network resource. If the retrieved information does not enable simple and direct mapping of the respective unknown type of storage area network resource to a known type of storage area network resource with sufficient certainty, then the mapping function herein accesses physical attribute information associated with the unknown type of storage area network resource to deduce a type associated with the unknown type of storage area network resource.

For example, the mapping function can attempt to deduce a type associated with the unknown type of storage area network resource based on functional capabilities or physical attributes associated with the unknown type of storage area network resource. If the mapping function is still unable to map the unknown type of storage area network resource with a high enough degree of certainty based on its physical attributes and/or retrieved configuration information, then the mapping function herein can apply an algorithm that compares retrieved configuration information (such as a data string received from and) associated with the unknown type of storage area network resource to respective configuration information (e.g., data strings) associated with the known types of storage area network resources. Longer matching sequences in the compared data strings indicate a higher likelihood that the unknown type of storage area network resource matches a respective known type of storage area network resource. Consequently, the techniques herein reduce uncertainty and simplify mapping associated with unknown types of storage area network resources.

In view of the specific embodiment discussed above, more general embodiments herein are directed to a mapping function that receives data (e.g., a data string) originated or generated by an unknown type of storage area network resource. The received data can indicate vendor information and model information associated with the unknown type of storage area network resource. The mapping function initially attempts to match the unknown type of storage area network resource to a known type of storage area network resource based on the received data.

In response to failing to identify the unknown type of storage area network resource as a certain match to a specific type of known storage area network resource based on the vendor information and model information provided by the unknown type of storage area network resource, the mapping function utilizes physical attributes (e.g., cache size, number ports, number of disks, etc.) associated with the unknown type of storage area network resource to narrow a number of possible matches of the unknown type of storage area network resource to an actual type of known storage area network resource. Accordingly, one embodiment herein is directed towards utilizing physical attributes information to identify the unknown type of storage area network resource as a respective known type of storage area network resource.

If the unknown type of storage area network resource can't be (confidently) mapped based on physical attribute information as discussed above, the mapping function herein attempts to match a data string received from the unknown type of storage area network resource to each of one or more corresponding data strings associated with a corresponding particular known type of storage area network resource. Based on a high degree of commonality between the received data string and a data string associated with a particular known type of storage area network resource, the mapping function can potentially provide an indication that the unknown type of storage area network resource is of a same type as the corresponding particular known type of storage area network resource even though the data string generated by the unknown type of storage area network resource fails to include enough attribute information to positively indicate that the unknown type of storage area network is definitively the same type as the corresponding particular known type of storage area network resource.

For cases in which the mapping function cannot provide a high degree of certainty based on application of a string compare algorithm as discussed above, the mapping function can utilize the string compare algorithm to detect which of multiple known types of storage area network resources have corresponding data string information that most closely match the information associated with the unknown type of storage area network. In other words, the mapping function can map or narrow the unknown type of storage area network resource to multiple identifiers of corresponding known types of storage area network resources that are most likely a same type as the unknown type of storage area network resource. Because of the potential uncertainty as to a particular type associated with the unknown type of storage area network resource, the mapping function can enable a respective user to assign a type associated with the unknown type of storage area network resource by: i) presenting the multiple identifiers associated with the multiple corresponding known types of storage area network resources on a display screen for viewing by a user, and ii) enabling the user to select and assign one of the corresponding multiple identifiers as a type associated with the unknown type of storage area network resource.

Techniques herein are well suited for use in applications such as mapping of unknown types of storage area network resources to known types of storage area network resources. However, it should be noted that configurations herein are not limited to such use and thus configurations herein and deviations thereof are well suited for use in other environments as well.

In addition to the embodiments discussed above, other embodiments herein include a computerized device (e.g., a host computer, workstation, etc.) configured to support the techniques disclosed herein such as mapping unknown types of storage area network resource to known types of storage area network resources in a respective storage area network environment. In such embodiments, the computerized device such as a mapping system includes a memory system, a processor (e.g., a processing device), a respective display, and an interconnect connecting the processor and the memory system. The interconnect can also support communications with the respective display (e.g., display screen or display medium). The memory system is encoded with an application that, when executed on the processor, generates a process for mapping resources according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support mapping according to embodiments herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for mapping unknown types of storage area network resource to specific type identifiers associated with known types of storage area network resources. The instructions, when carried out by a processor of a respective computer device, cause the processor to perform the steps of: i) receiving information indicating attributes associated with an unknown type of storage area network resource; ii) performing a comparison of the information associated with the unknown type of storage area network resource and a set of characteristic information associated with corresponding known types of storage area network resources; and iii) based on the comparison, mapping the unknown type of storage area network resource to at least one specific identifier of a corresponding known type of storage area network resource.

Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate in connection with the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

FIG. 2 is a diagram illustrating a sample of mapped and unmapped resources according to an embodiment herein.

FIG. 11 is a sample screenshot of a display screen displaying a table of mapped and unmapped resources according to an embodiment herein.

FIG. 13 is a sample screenshot of a display screen illustrating a listing of closest matching parameters associated with known type of storage area network resources according to an embodiment herein.

DETAILED DESCRIPTION

According to one embodiment, a mapping process initially attempts to map a respective unknown storage area network resource directly to a known type of storage area network resource based on vendor and model information (or other information) received from the unknown type of storage area network resource. If the mapping process is unable to precisely map a respective unknown type of storage area network resource to a known type of storage area network resource with sufficient certainty based on the vendor and model information collected from the unknown type of storage area network resource, then the mapping function herein utilizes physical attribute information associated with the unknown storage area network resource for mapping purposes. Typically, the attribute information can be retrieved from a storage area network resource configuration database or directly from the unknown type of storage area network resource.

If the unknown type of storage area network resource can't be mapped with a sufficient degree of certainty based on its physical attributes and/or configuration information associated with the unknown type of storage area network resource, then the mapping function herein applies an algorithm to compare information (such as a data string received from and) associated with the unknown type of storage area network resource to respective data strings of information (e.g., configuration information) associated with known types of storage area network resources. Longer matching sequences between the compared data strings indicates a higher likelihood that the unknown type of storage area network resource matches a respective known type of storage area network resource.

Figure 1:
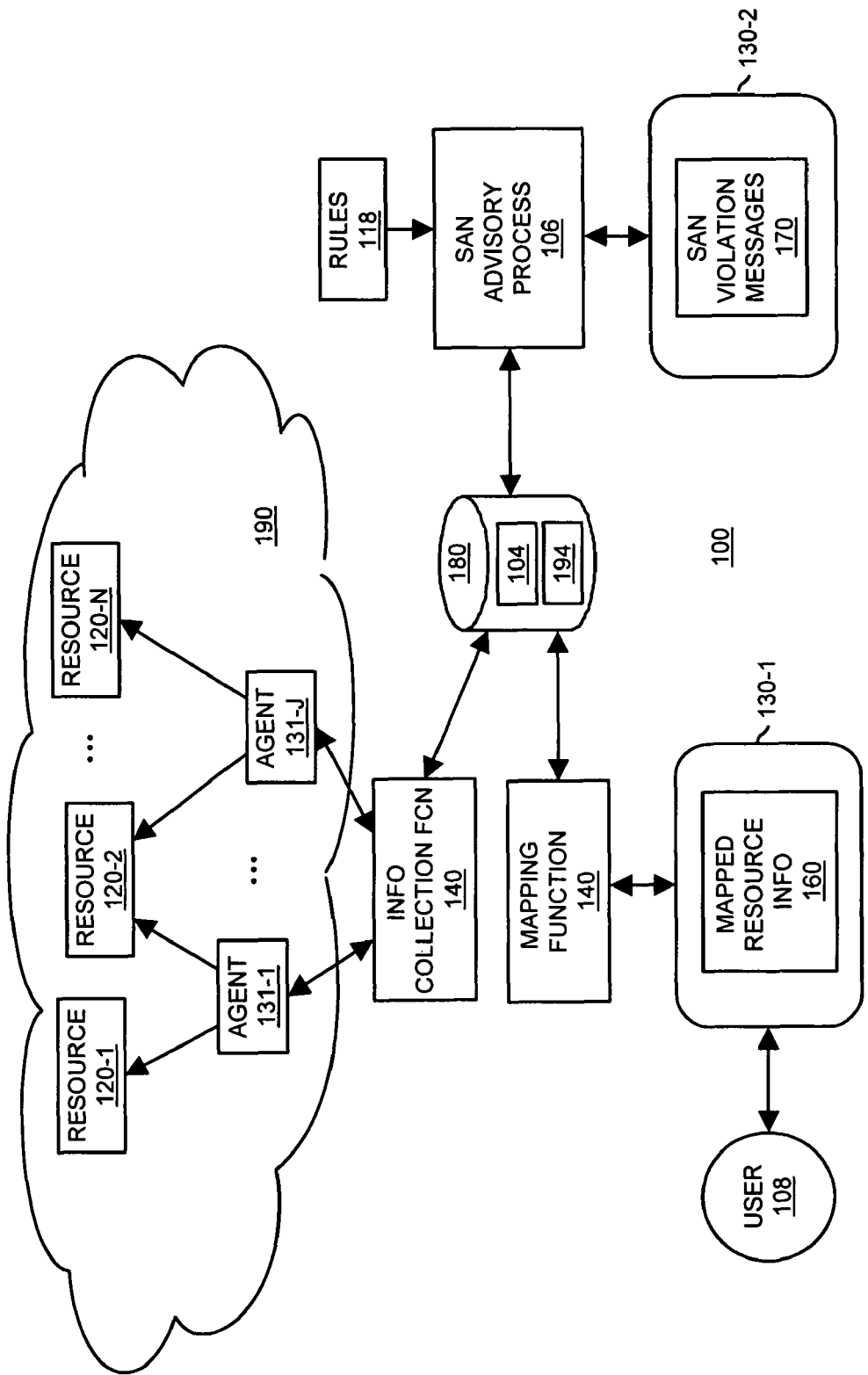
FIG. 1 is a diagram illustrating an environment for mapping resources according to an embodiment herein.

FIG. 1 is a block diagram of a storage area network environment 100 according to an embodiment herein. As shown, storage area network environment 100 includes storage area network 190, information collection function 142, mapping function 140, display screen 130 (e.g., display screen 130-1 and display screen 130-2), user 108, repository 180, SAN advisory process 106, and rules 118. Storage area network 190 includes agents 131 (e.g., agent 131-1, . . . , agent 131-J), and resources 120 (e.g., resource 120-1, resource 120-2, . . . , resource 120-N). Display screen 130-1 (e.g., screenshot of display screen 130 at time T1) displays mapped resource information 160. Display screen 130-2 (e.g., a screenshot of display screen 130 at time T2, which is later than T1) displays storage area network violation messages 170. Repository 180 stores configuration information 104.

In the context of a general embodiment herein, SAN advisory process 106 applies rules 118 to SAN configuration information 104 for purposes of generating and displaying storage area network violation messages 170 on display screen 130-2 for viewing by a respective user 108. Accordingly, a respective user 108 can correct any incompatibility issues. Rules 118 specify which specific types of storage area network resources are compatible or incompatible with each other. As previously discussed, keeping track of a specific type associated with each of many storage area network resources can be a challenge. Prior to executing SAN advisory process 106, a respective user 108 initiates execution of mapping function 140 to assign appropriate identifier values or types to each of storage area network resources 120.

According to one embodiment herein, agents 131 communicate with storage area network resources 120 to learn of respective configuration and settings information associated with the respective storage area network resources 120. The retrieved information (e.g., configuration and settings information) from the storage area network resources 120 does not always specify actual types associated with the storage area network resources 120. For example, based on respective queries, a respective storage area network resource 120-1 (e.g., a host or server) may provide vendor and model information indicating that a respective storage area network resource 120-1 is a Solaris™ 2.9 operating system. The actual type associated with storage area network resource 120-1 can be one of multiple types of different Solaris™ operating systems such as Solaris™ version 8 or Solaris™ version 9, etc. as would be understood by rules 118. In other words, Solaris 2.9 is not a specific enough description as it can indicate one of many different types, versions, or species of operating systems. Thus, prior to application of rules 118 and generation of SAN violation messages 170, mapping function 140 performs a process of mapping (or at least attempting to map) each of the storage area network resources 120 to a respective species or known type of storage area network resource as specified and understood by the rules 118. Mapping the storage area network resources 120 in storage area network 190 based on a same set of standards or guidelines as used to identify resources in rules 118 ensures that SAN violation messages 170 accurately indicate occurrences of incompatible resources.

In one embodiment, information collection function 142 communicates with agents 131 and stores corresponding information associated with the storage area network resource 120 as configuration information 104 in repository 180. Mapping function 140 utilizes the configuration information 104 in repository 180 to generate an actual mapping of unknown type of storage area network resources to corresponding known types of storage area network resources. In other words, mapping function 140 assigns or attempts to assign each unknown type of storage area network resource to a corresponding known type of storage area network resource. Such a process can include presenting mapped resource information 160 on display screen 130-1 for viewing by a respective user 108.

FIG. 2 is a diagram illustrating mapped resource information 160 including table 210 of mapped and unmapped storage area network resources 120 according to an embodiment herein. Column 205-1 of table 210 indicates whether the mapping function 140 was able to map a respective storage area network resource 120 into a corresponding known type of storage area network resource. Column 205-2 of table 210 indicates collected information (e.g., raw data string information) associated with a respective storage area network resource 120 that is used to map or attempt mapping of unknown types of storage area network resources 120 to respective known types of storage area network resource identifiers. The information appearing in column 205-2 can include actual data strings of information collected from and originated by different types of sources such as a respective network administrator, the storage area network resources 120, agents 131, etc. In one embodiment, the column 205-2 of collected information represents data string information (e.g., vendor and model information) generated by and received from a respective storage area network resource. Column 205-3 of table 210 includes specific identifier values indicating deduced identifier types associated with respective storage area network resources 120 as specified by mapping function 140. That is, as previously discussed, the mapping function 140 utilizes the collected information in column 205-2 (and potentially other information) to generate the specific type identifier values in column 205-3.

In certain cases, the mapping function 140 is able to immediately map a respective storage area network resource 120 to a corresponding identifier value based on the collected information in column 205-2. For example, the mapping function 140 uses a global mapping technique to map the collected information (e.g., MS Windows™ 2000 Service pack 4) in row 215-4 directly to a respective known type of storage area network resource, namely, MS Windows™ 2000 Service pack 4 understood by the SAN advisory process 106.

Figure 3:
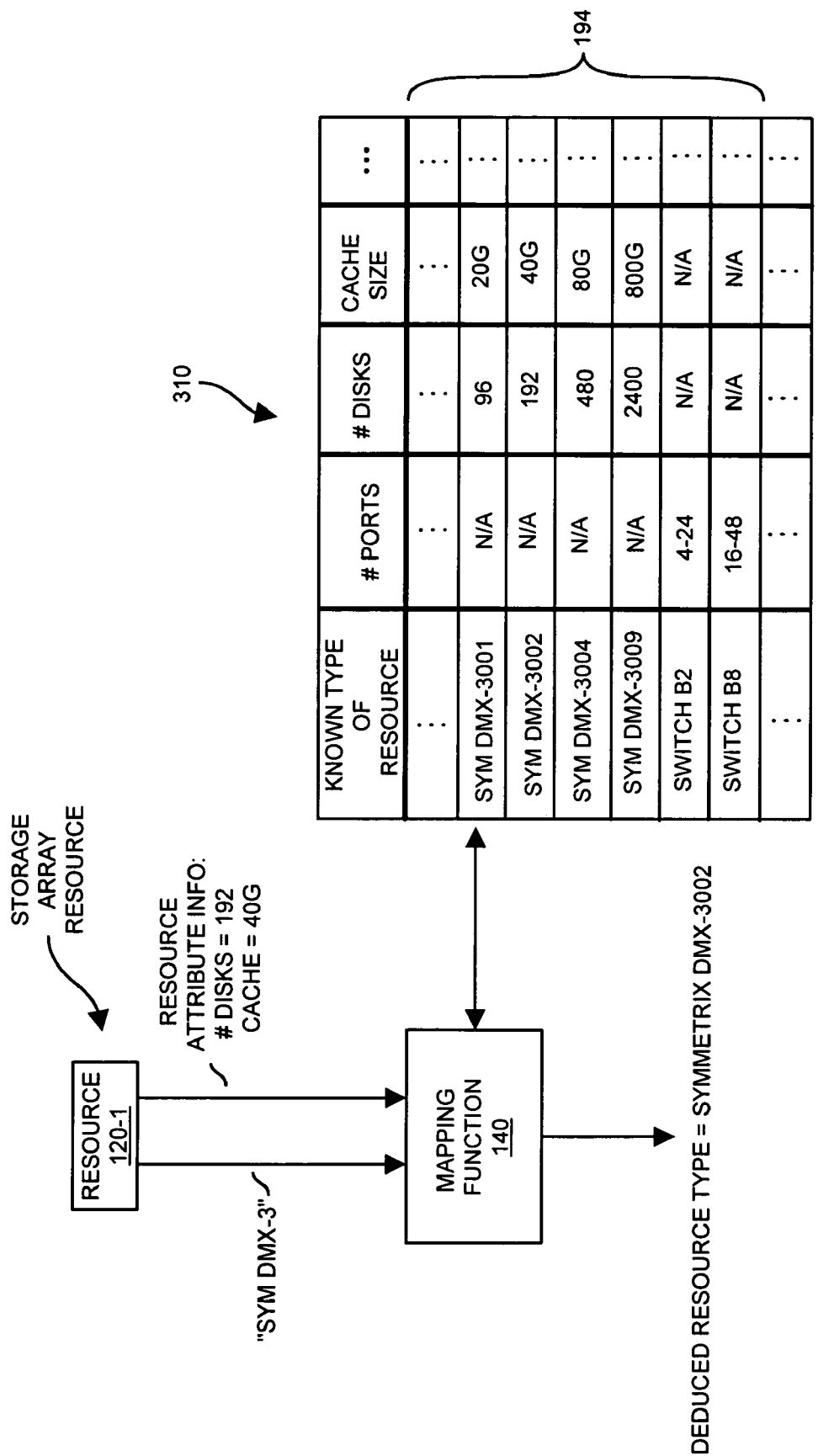
FIG. 3 is a diagram illustrating how to deduce a type of resource based on information associated with known types of resources according to an embodiment herein.

Other entries in table 210 require the mapping function 140 to perform further processing because the collected information in column 205-2 of table 210 does not lend itself to a direct mapping from the unknown type of storage area network resource to a respective known type of storage area network resource. For example, assume as shown in FIG. 3 that the mapping function 140 receives information associated with storage area network resource 120-1, which happens to be a storage array. The mapping function 140 can retrieve the information from any source such as from the storage area network resource 120-1 as well as from other sources such a repository 180, network administrator, etc.

Based on the received data string information "SYM DMX-3" in column 205-2, the mapping function 140 attempts to globally map the storage area network resource 120-1 to a known type of storage area network resource. Assume that an initially applied global mapping process fails because multiple different types of resources provide the same data string of information when queried about vendor and model information. Even though the mapping function 140 cannot precisely map storage area network resource 120-1 based on the string "SYM DMX-3," the mapping function 140 can narrow unknown type of storage area network resource to several possible known type of storage area network resources such as a SYM DMX-3001, SYM DMX-3002, SYM DMX-3004, and SYM DMX-3009.

To determine or deduce the actual type of resource associated with the storage area network resource 120-1, the mapping function 140 can retrieve and utilize additional information associated with the storage area network resource 120-1. For example, in one embodiment, the mapping function 140 retrieves resource attribute information associated with the storage area network resource 120-1 as shown in FIG. 3. In this example, the resource attribute information indicates that storage area network resource 120-1 is configured with 192 disks and a 40 Gigabyte cache. The mapping function 140 uses this additional information to search entries in table 310. Based on a comparison of the received attribute information and attribute information associated with known type of storage area network resources in table 310, the mapping function 140 deduces that the storage area network resource 120-1 is a Symmetrix™ DMX-3002 storage array because this is the only entry that has attribute information matching the phys attribute information associated with storage area network resource 120-1. Accordingly, row 215-5 in table 210 of FIG. 2 indicates that storage area network resource 120-1 has been successfully identified as (e.g., mapped to) a Symmetrix™ DMX-3002 storage array. In other words, the mapping function 140 initiates display of a type identifier value (e.g., Symmetrix™ DMX-3002 storage array) indicating a deduced type associated with the unknown type of storage area network resource 120-1.

Figure 4:
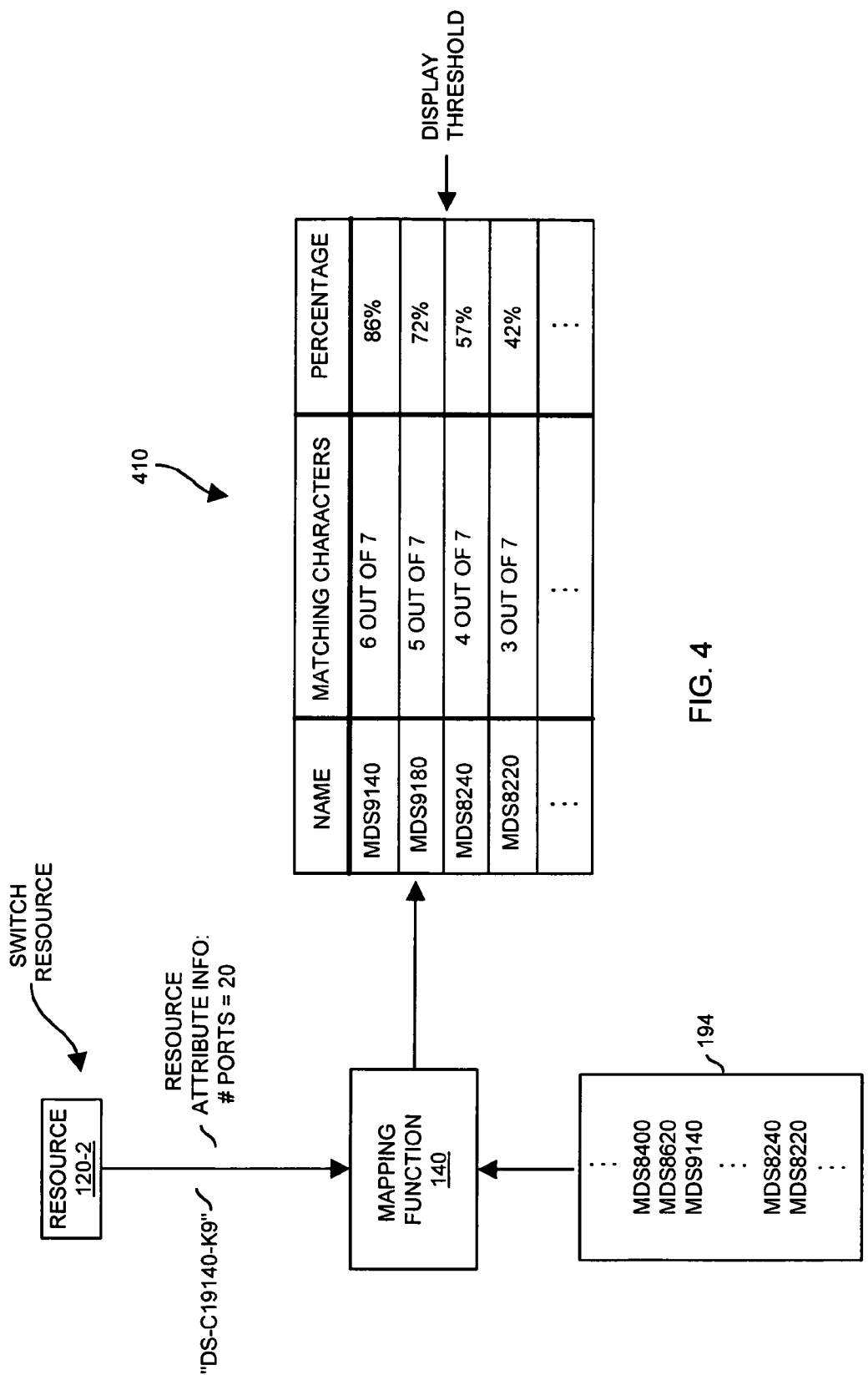
FIG. 4 is a diagram illustrating application of an algorithm to identify matching portions of data strings according to an embodiment herein.

Note that in certain cases, the mapping function 140 is unable to deduce (with a high degree of certainty) a respective type identifier associated with a respective unknown type of storage area network resource. For example, row 215-3 in table 210 of FIG. 2 indicates that storage area network resource 120-2 has not been mapped to any known type of resource. FIG. 4 illustrates a technique in which the mapping function 140 can utilize a compare algorithm to compare data string information for mapping purposes. In one embodiment, the compare algorithm is applied if utilization of attribute information as discussed in FIG. 3 fails to enable mapping function 140 to produce a type identifier value.

As shown in FIG. 4, mapping function 140 receives the string of information "DS-C19140-K9" from storage area network resource 120-2. Assume in this example that attribute information associated with the storage area network resource 120-2 does not provide any useful information for narrowing a resource down to a specific type based on use of the table 310 in FIG. 3. Referring again to FIG. 4, to narrow a number of possible matches, the mapping function 140 compares the raw string of data received from the storage area network resource 120-2 and compares it to information (e.g., data strings) 194 associated with known types of storage area network resources.

In one embodiment, the mapping function utilizes a longest matching subsequence test to help deduce a type associated with a respective storage area network resource. For example, the mapping function 140 compares the data string "DS-C19140-K9" to data string "MDS9140" and identifies that 6 out of 7 characters in the known type of storage area network resource (e.g., the MDS9140) match characters found in the data string "DS-C19140-K9." In this example, table 410 illustrates an 86% matching of characters between data strings indicating a high likelihood that storage area network resource 120-2 is an MDS9140.

Additionally, the mapping function 140 compares the data string "DS-C19140-K9" to data string MDS9180 and identifies that 5 out of 7 characters in the known type of storage area network resource (e.g., the MDS9180) match character information found in the data string "DS-C19140-K9." Thus, there is a 72% matching of characters indicating a fairly high likelihood that storage area network resource 120-2 is an MDS9180.

Although other entries associated with information 194 provide at least some degree of matching, these latter entries have fewer and fewer matching characters. This indicates a lower likelihood that the unknown type of storage area network resource 120-2 is a corresponding type o known type of storage area network resource. For example, mapping function 140 compares the data string "DS-C19140-K9" to MDS8240 and identifies that 4 out of 7 characters in the known type of storage area network resource (e.g., the MDS8240) match characters found in the data string "DS-C19140-K9." In this example, there is a 57% matching of characters indicating a lower likelihood that storage area network resource 120-2 is an MDS8240.

The mapping function 140 repeats the above process for MDS8220 and identifies an even lower matching rate indicating a yet lower likelihood that the unknown type of storage area network resource 120-2 is a MDS8220.

Because of the above uncertainty that the storage area network resource 120-2 maps to an MDS9140, according to one embodiment herein, table 210 in FIG. 2 indicates that storage area network resource 120-2 has not been successfully mapped to a respective known type of storage area network resource. In certain applications, the mapping function 140 could assign the type identifier of MDS9140 to storage area network resource 120-2 without further user 108 intervention because of the high degree of matching characters.

To manually initiate a mapping, the respective user 108 can assign a respective type associated with the storage area network resource 120-2 by clicking on symbol 250-3 (of FIG. 2), viewing a list (e.g., all or part of table 410 in FIG. 4) of most likely matching candidates on display screen 130-1, and selecting one (e.g., the MDS9140) of multiple entries (e.g., as in table 410 of FIG. 4) as a type identifier. Thus, for unmapped entries in table 210 of FIG. 2, the respective user 108 can modify and provide final decisions as to how to map respective storage area network resources.

In one embodiment, the mapping information (e.g., automatically mapped information and/or manually mapped information) can be stored as a mapping definition file for reuse at a later time. The auto-mapping process as discussed herein can be a one-time process in which the user creates a mapping of resources to appropriate identifier values such that the mapping definition file includes identifiers understood by the SAN advisory process 106 instead of ambiguous names. After an initial mapping and creation of the mapping definition file, a respective network administrator or user 108 need only make incremental mapping changes (as assisted with the auto mapping features as discussed herein) for any upgrades or changes to originally mapped SAN configuration information 104.

As an example, assume that a respective user is initially uses Windows 2000 SP1 (Service pack 1) as an operating system. This resource would be mapped to Windows 2000 Service Pack 1 at a respective initial bulk mapping of unknown resources to known types of storage area network resources in the storage area network environment. As discussed above, this information is used for any subsequent snap shots of the environment by the SAN advisory process 106. When a respective user upgrades a respective operating system to a Windows 2000 SP2 Service Pack 2), the SAN advisory process 106 initiates the "auto-mapping" function as discussed herein only for the newly changed entity (e.g., the updated operating system) in the storage area network environment.

Note that when clicking symbol 250-3, a respective display function can display only a portion (such as those having more matching characters) of known types of storage area network resources to a respective user 108 such as the closest matches above the display threshold.

Figure 5:
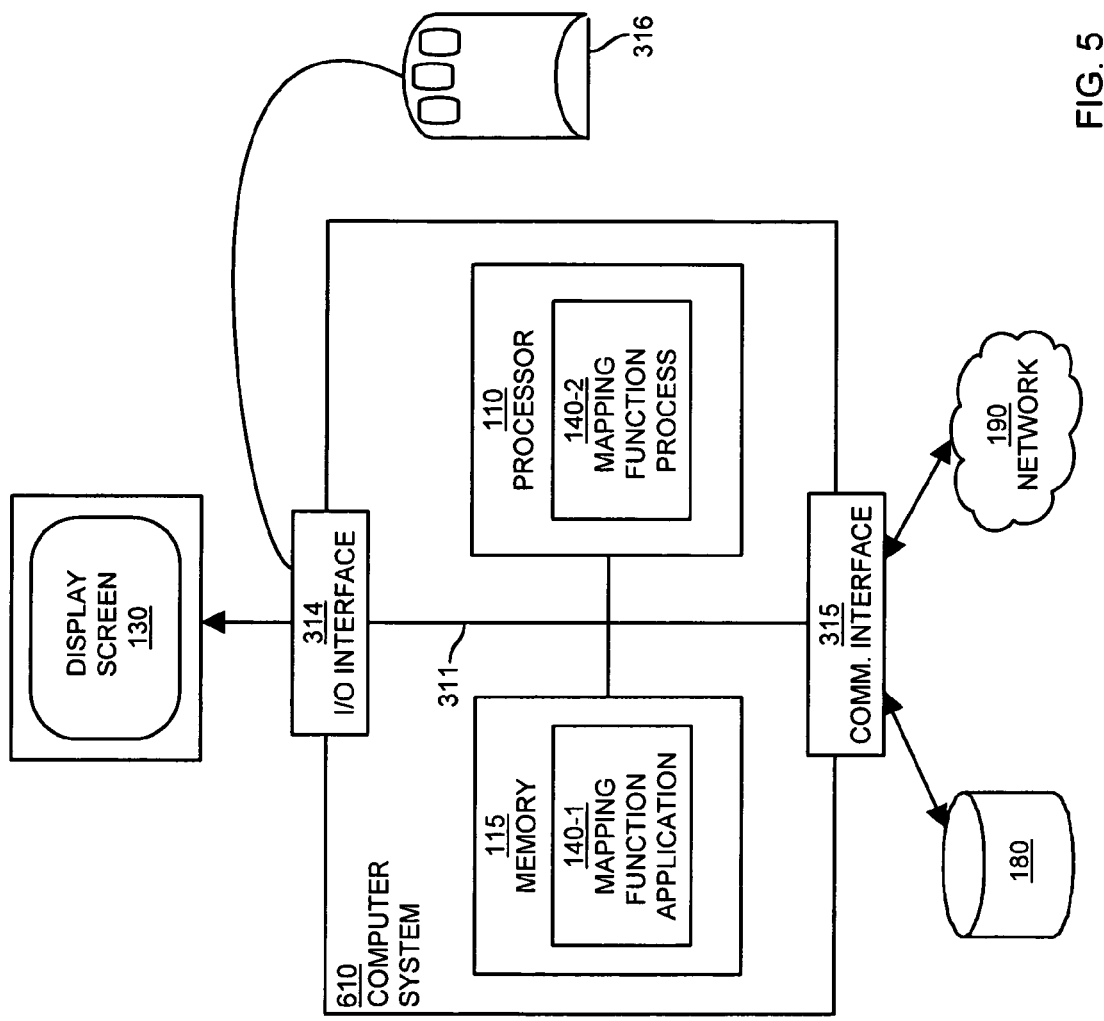
FIG. 5 is a diagram of an example platform for executing a mapping function according to embodiments herein.

FIG. 5 is a block diagram illustrating an example computer system 610 (e.g., a management control center) for executing mapping function 140 and other related processes according to embodiments herein. Computer system 610 can be a computerized device such as a personal computer, workstation, portable computing device, console, network terminal, processing device, etc.

As shown, computer system 610 of the present example includes an interconnect 311 that couples a memory system 115, a processor 110, an I/O interface 314, and a communications interface 315. Peripheral devices 316 (e.g., one or more optional user controlled devices such as a keyboard, mouse, display screens, etc.) couple to processor 110 through I/O interface 314. I/O interface 314 also enables computer system 610 to access repository 180 and display configuration information on display screen 130. Communications interface 315 enables computer system 310 to communicate over network 190 to transmit and receive information from different resources (e.g., agents 131, storage area network resources 120, etc.) in storage area network environment 100. In one embodiment, computer system 610 can initiate the display of configuration information on corresponding display screens for viewing by one or more respective network administrators (e.g., user 108) that manage and view configuration associated with storage area network environment 100 (FIG. 1). In one embodiment, computer system 610 also supports execution of SAN advisory process 106 for application of rules 118.

As shown, memory system 115 is encoded with mapping function application 140-1 supporting assignment of type identifiers to unknown or partly known types of storage area network resources. Mapping function application 140-1 can be embodied as software code such as data and/or logic instructions (e.g., code stored in the memory or on another computer readable medium such as a disk) that support functionality according to different embodiments described herein.

During operation, processor 110 accesses memory system 115 via the interconnect 311 in order to launch, run, execute, interpret or otherwise perform the logic instructions of the mapping function application 140-1. Execution of mapping function application 140-1 produces processing functionality in mapping function process 140-2. In other words, the mapping function process 140-2 represents one or more portions of the mapping function application 140-1 (or the entire application) performing within or upon the processor 110 in the computer system 610.

It should be noted that the mapping function process 140-2 executed in an environment such as computer system 610 can be represented by either one or both of the mapping function application 140-1 and/or the mapping function process 140-2. For purposes of this discussion and different embodiments herein, general reference will again be made to the mapping function 140 as performing or supporting the various steps and functional operations as previously discussed and as will be discussed further in this specification.

It should be noted that, in addition to the mapping function process 140-2, embodiments herein include the mapping function application 140-1 itself (i.e., the un-executed or non-performing logic instructions and/or data). The mapping function application 140-1 can be stored on a computer readable medium such as a floppy disk, hard disk, or optical medium. The mapping function application 140-1 can also be stored in a memory type system such as in firmware, read only memory (ROM), or, as in this example, as executable code within the memory system 115 (e.g., within Random Access Memory or RAM). In addition to these embodiments, it should also be noted that other embodiments herein include the execution of mapping function application 140-1 in processor 110 as the mapping function process 140-2. Thus, those skilled in the art will understand that the computer system 610 may include other processes and/or software and hardware components, such as an operating system that controls allocation and use of hardware resources.

Functionality supported by computer system 610 such as a management control center utilizing mapping function 140 will now be discussed with respect to flowcharts in FIG. 6-9.

For purposes of this discussion, computer system 610 and, more particularly, mapping function 140 (or related functions) generally perform steps in the flowcharts at run-time. This functionality can be extended to the other entities as well. Also, note that the steps in the below flowcharts need not always be executed in the order shown.

Figure 6:
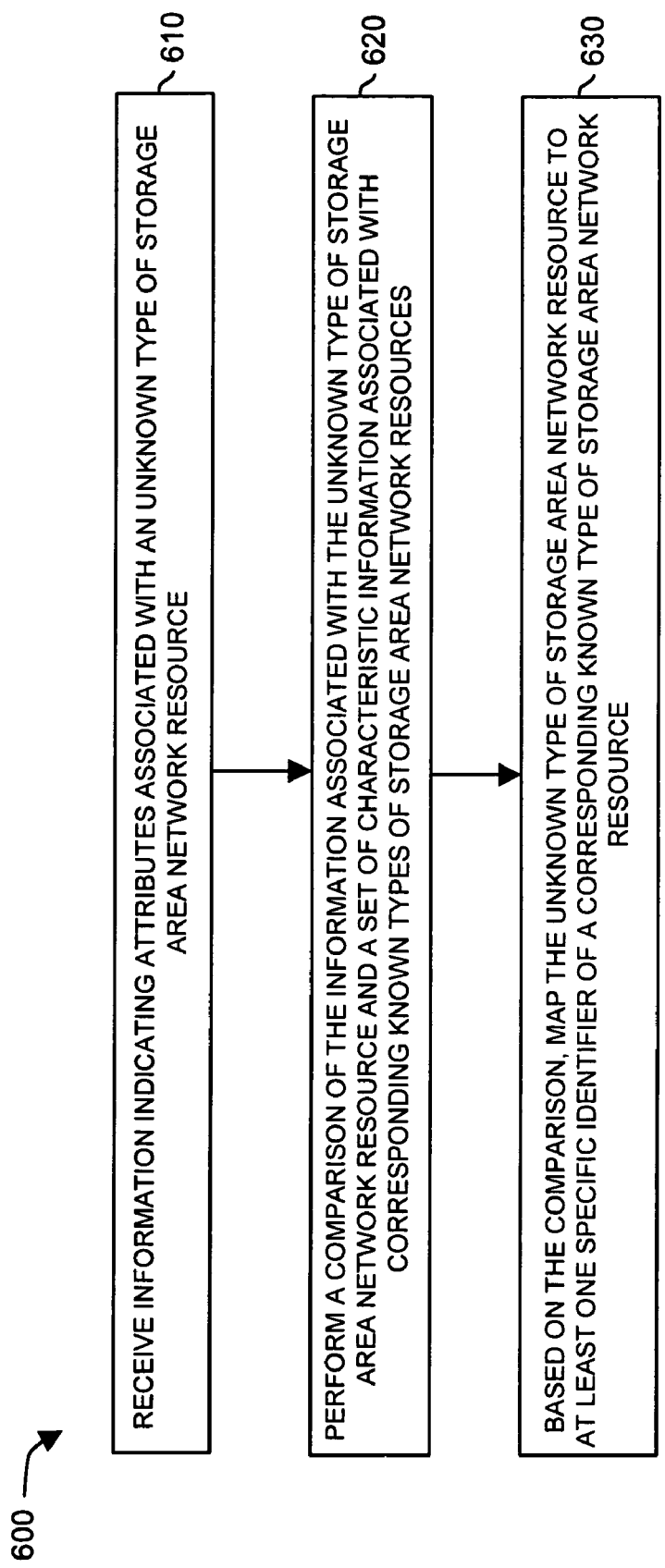
FIG. 6 is a flowchart illustrating techniques of mapping resources according to embodiments herein.

Now, more particularly, FIG. 6 is a flowchart 600 illustrating a technique of assigning type identifiers to respective resources in storage area network environment 100 according to an embodiment herein. Note that techniques discussed in flowchart 600 overlap and summarize some of the techniques discussed above.

In step 610, the mapping function 140 receives information indicating attributes (e.g., resource attribute information as shown in FIG. 3) associated with an unknown type of storage area network resource 120-1.

In step 620, the mapping function 140 performs a comparison of the information (e.g., attribute information) associated with the unknown type of storage area network resource 120-1 and a set of characteristic information (e.g., configuration information 194) stored in repository 180 associated with corresponding known types of storage area network resources.

In step 630, based on the comparison, the mapping function 140 maps the unknown type of storage area network resource to at least one specific identifier (e.g., a single identifier or multiple identifiers) of a corresponding known type of storage area network resource.

Figure 7:
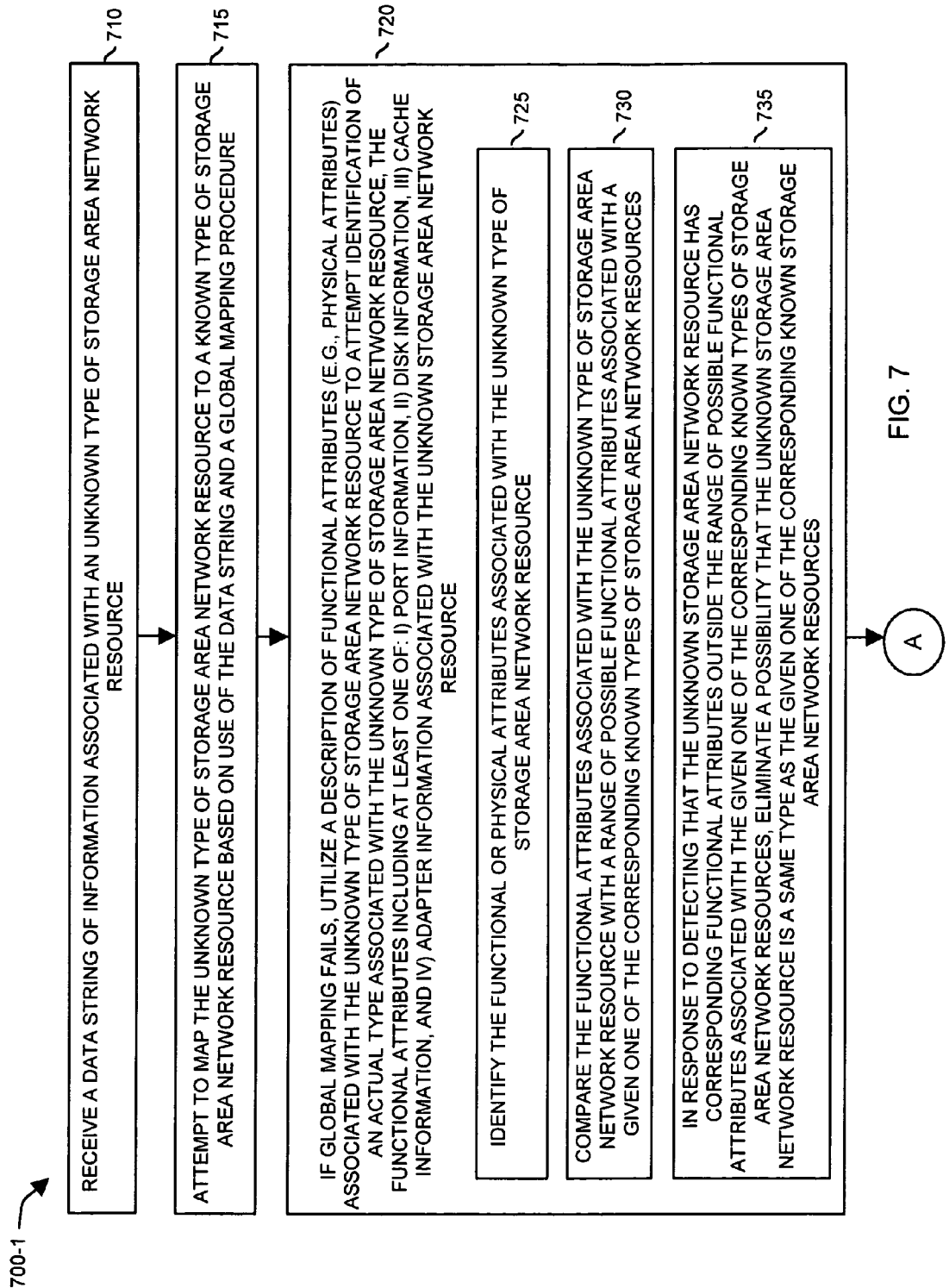
FIGS. 7 and 8 combine to form a more detailed flowchart illustrating mapping techniques according to embodiments herein.
Figure 8:
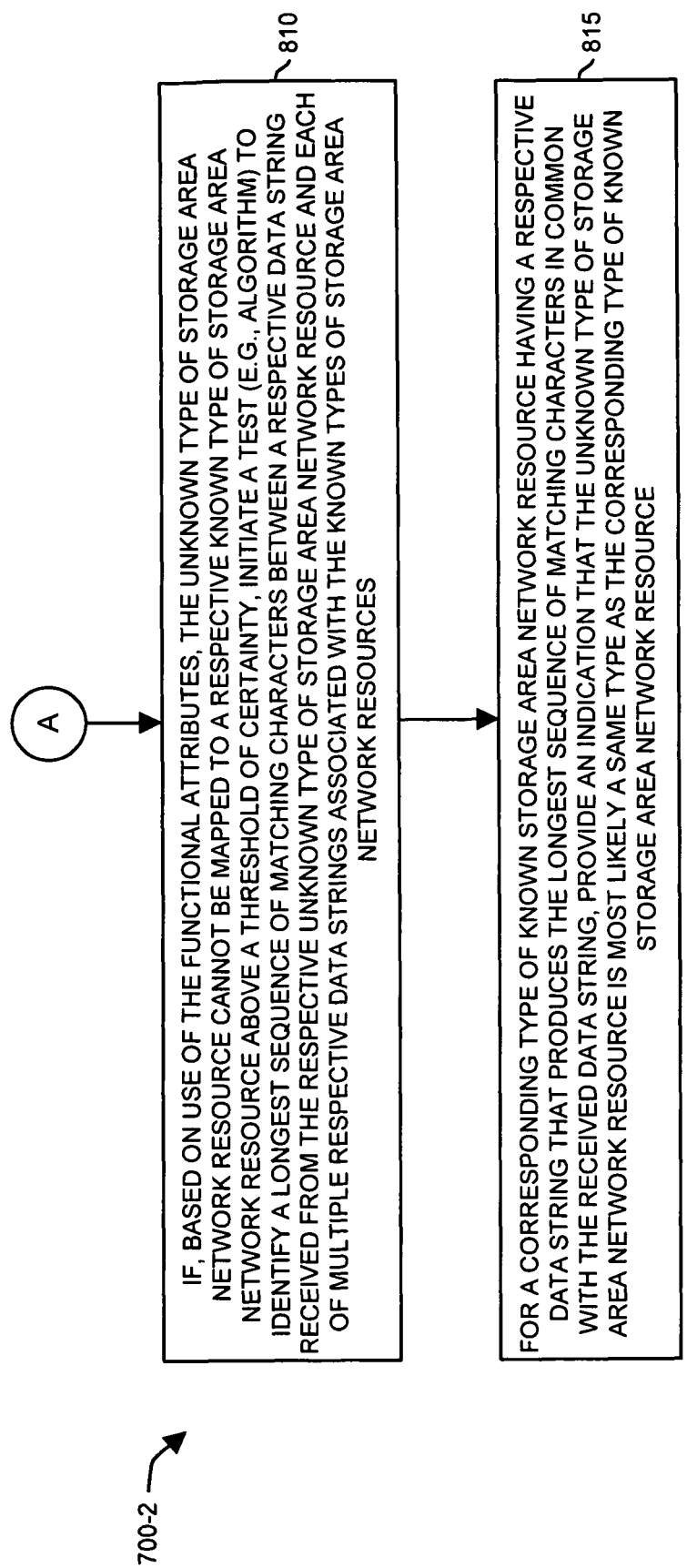

FIGS. 7 and 8 combine to form a flowchart 700 (e.g., flowchart 700-1 and flowchart 700-2) illustrating processing steps associated with mapping function 140 according to an embodiment herein. Note that techniques discussed in flowchart 700 overlap with the techniques discussed above in the previous figures.

In step 710, the mapping function 140 receives a data string of information (e.g., DS-C19140-K9 as in FIG. 4) associated with an unknown type of storage area network resource 120-2.

In step 715, the mapping function 140 attempts to map the unknown type of storage area network resource 120-2 to a known type of storage area network resource based on use of the data string (e.g., DS-C19140-K9 originated by the storage area network resource or other configuration information) and a global mapping procedure.

In step 720, if the global mapping fails to produce a type identifier, the mapping function 140 utilizes a description of functional attributes (e.g., physical attributes such as information indicating that storage area network resource 120-2 is configured with 20 ports) associated with the unknown type of storage area network resource 120-2 to attempt identification of an actual type associated with the unknown type of storage area network resource 120-2. As previously discussed, the functional attributes associated with different types of storage area network resources 120 can include information such as: i) port information, ii) disk information, iii) cache information, and iv) adapter information, etc. associated with the unknown storage area network resource 120-2.

In step 725, the mapping function 140 identifies the functional or physical attributes associated with the unknown type of storage area network resource.

In step 730, the mapping function 140 compares the functional attributes (e.g., 20 ports) associated with an unknown type of storage area network resource 120-2 with a range of possible functional attributes associated with a given one of the corresponding known types of storage area network resources. For example, the mapping function can compare the attribute information associated with storage area network resource 120-2 to information associated with SWITCH B2 and SWITCH B8 in table 310 of FIG. 3. In this example, use of port attribute information does not narrow possible matches because both types of switches B2 and B8 identify respective ranges that support 20 ports.

In step 735, in response to detecting when an unknown storage area network resource has corresponding functional attributes outside of a respective range of possible functional attributes associated with the given one of the corresponding known types of storage area network resources, the mapping function 140 can eliminate a possibility that the unknown storage area network resource is a same type as the given one of the corresponding known storage area network resources. For example, if a respective storage area network resource such as a switch has corresponding attribute information indicating that the storage area network resource has 32 ports, based on table 310 in FIG. 3, then the mapping function 140 can eliminate a possibility that the respective storage area network resource is of a type SWITCH B2.

In step 810 in flowchart 700-2 in FIG. 8, if, based on use of the functional attributes, the unknown type of storage area network resource cannot be mapped to a respective known type of storage area network resource above a threshold of certainty, the mapping function 140 can initiate a test (e.g., character compare algorithm) to identify a longest sequence of matching characters between a respective data string received from or associated with the respective unknown type of storage area network resource and each of multiple respective data strings associated with the known types of storage area network resources.

In step 815, for a corresponding type of known storage area network resource having a respective data string that produces the longest sequence of matching characters in common with a received data string, the mapping function 140 provides an indication that the unknown type of storage area network resource is most likely a same type as the corresponding type of known storage area network resource.

Figure 9:
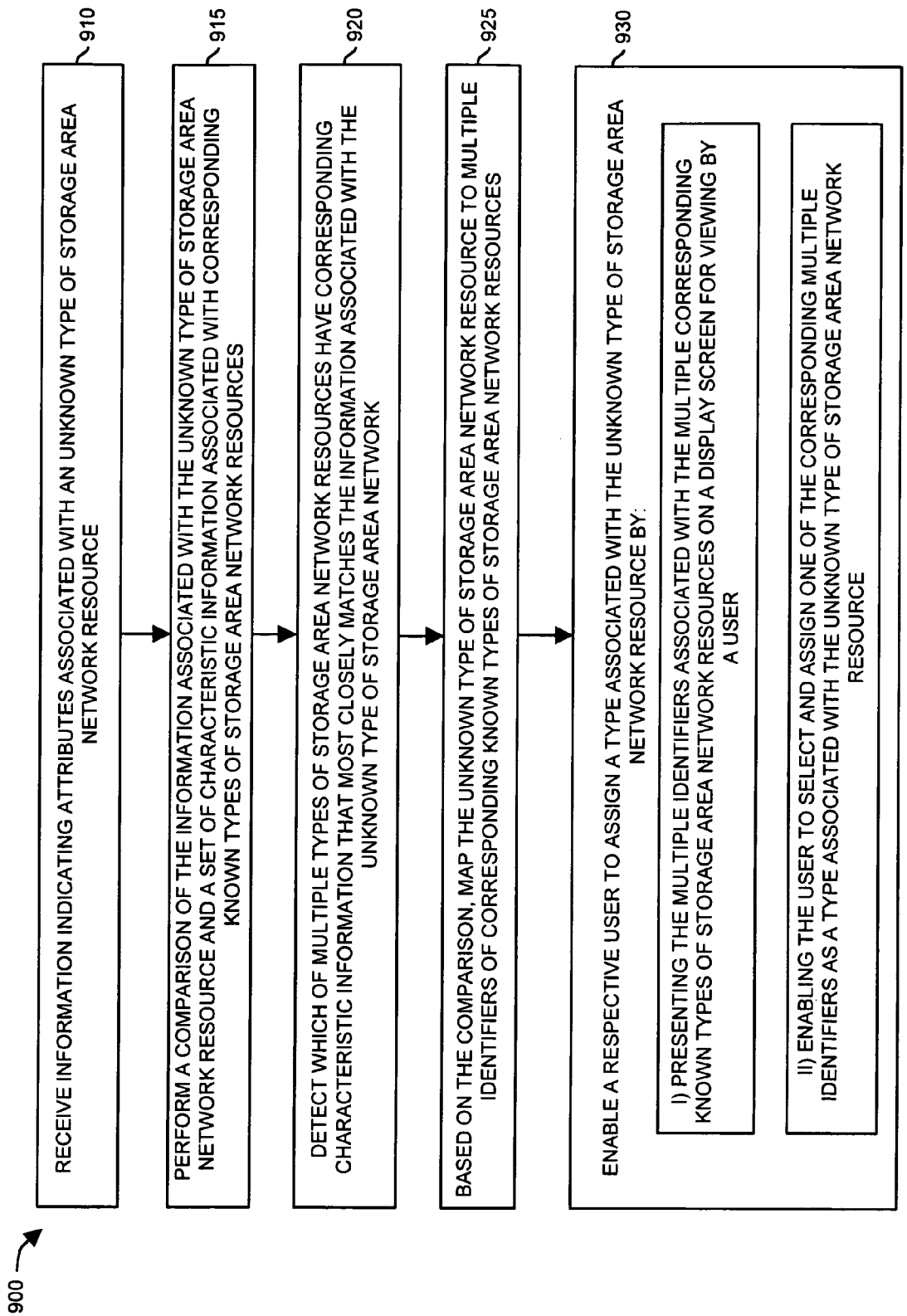
FIG. 9 is a flowchart illustrating techniques of mapping resources according to embodiments herein.

FIG. 9 is a flowchart 900 illustrating another technique associated with assignment of type identifiers according to an embodiment herein. Note that techniques discussed in flowchart 900 overlap and summarize some of the techniques discussed above.

In step 910, the mapping function 140 receives information indicating attributes associated with an unknown type of storage area network resource 120.

In step 915, the mapping function 140 performs a comparison of the information associated with the unknown type of storage area network resource and a set of characteristic information associated with corresponding known types of storage area network resources.

In step 920, the mapping function 140 detects which of multiple types of storage area network resources have corresponding characteristic information that most closely matches the information associated with the unknown type of storage area network.

In step 925, based on the comparison, the mapping function 140 maps the unknown type of storage area network resource to multiple identifiers of corresponding known types of storage area network resources. As discussed in FIG. 4, the mapping function 140 can provisionally map the storage area network resource 120-2 to an MDS9140 and MDS9180 because they are the most likely matching candidates.

In step 930, the mapping function 140 enables a respective user to assign a type associated with the unknown type of storage area network resource by: i) presenting (or enabling presentation of) the multiple identifiers (e.g., MDS9140 and MDS9180) associated with the multiple corresponding known types of storage area network resources on a display screen for viewing by a user, and ii) enabling the user to select and assign one of the corresponding multiple identifiers as a type associated with the unknown type of storage area network resource.

Figure 10:
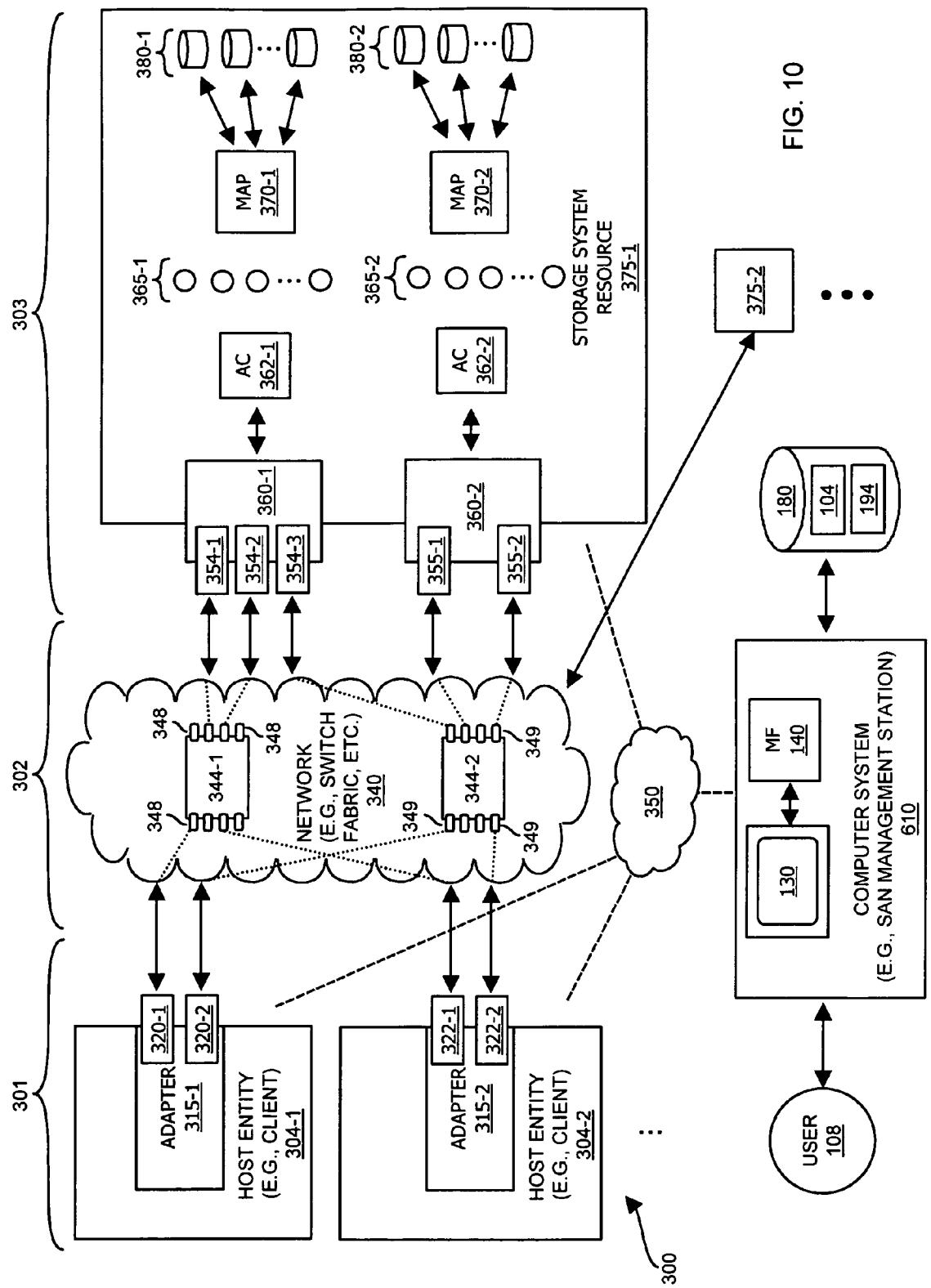
FIG. 10 is a block diagram illustrating resources in a storage area network environment according to an embodiment herein.

FIG. 10 is a block diagram more particularly illustrating connectivity of example resources (e.g., host resources 301, switch resources 302, and storage resources 303) in a storage area network environment 300. The resources and corresponding SAN configuration information 104 can be represented by managed objects and corresponding relationship information stored in repository 180 or other storage resource. In general, FIG. 10 illustrates different types of resources that can be employed in a respective storage area network environment 300.

As previously discussed for FIG. 1, a SAN advisory process 106 can apply rules 118 to indicate incompatible resources in storage area network environment 300 based on type identifiers. Mapping function 140 enables a respective user 108 to assign type identifiers associated with the different resources in storage area network environment 300. In one embodiment, the user 108 utilizes display screen 130 to perform assignment operations.

Now referring to specific attributes in FIG. 10, storage area network environment 300 includes host entity 304-1 (e.g., a server), host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and repository. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340.

Computer system 610 enables a storage area network administrator (e.g., user 108) to communicate over network 350 and remotely modify, manage, and configure storage area network 300. In one embodiment, computer system 610 enables collection of information associated with resources in the storage area network environment 300. As previously discussed, a respective user 108 initiates mapping function 140 for purposes of mapping the storage area network resources to appropriate type identifiers as previously discussed. After applying rules 118 to a known storage area network configuration, the SAN advisory process 106 (FIG. 1) can display storage area network violation messages 170 to user 108 indicating which resources are compatible or incompatible.

FIG. 11 is a sample screenshot 1100 of display screen 130 including a graphical user interface enabling a respective user 108 to review mappings according to an embodiment herein. As shown, table 1110 includes a column 1140 of raw data string information collected from respective storage area network resources 120. As previously discussed, the mapping function 140 utilizes the information in column 1140 to map or attempt to map respective resources to known identifier values. The mapping function 140 initiates display of the best guess identifier values in column 1130. Column 1120 includes a symbol indicating whether a storage area network resource has been mapped to a corresponding type identifier with a sufficient level of certainty. For example, check marks in column 1120 indicate that a respective resource has been mapped to a respective type identifier. Exclamation symbols in column 1120 indicate that a respective storage area network resource has not been mapped to a corresponding type identifier. Symbol 1161 enables a respective user 108 to view further information associated with the corresponding storage area network resource as will be further discussed in FIG. 12.

Figure 12:
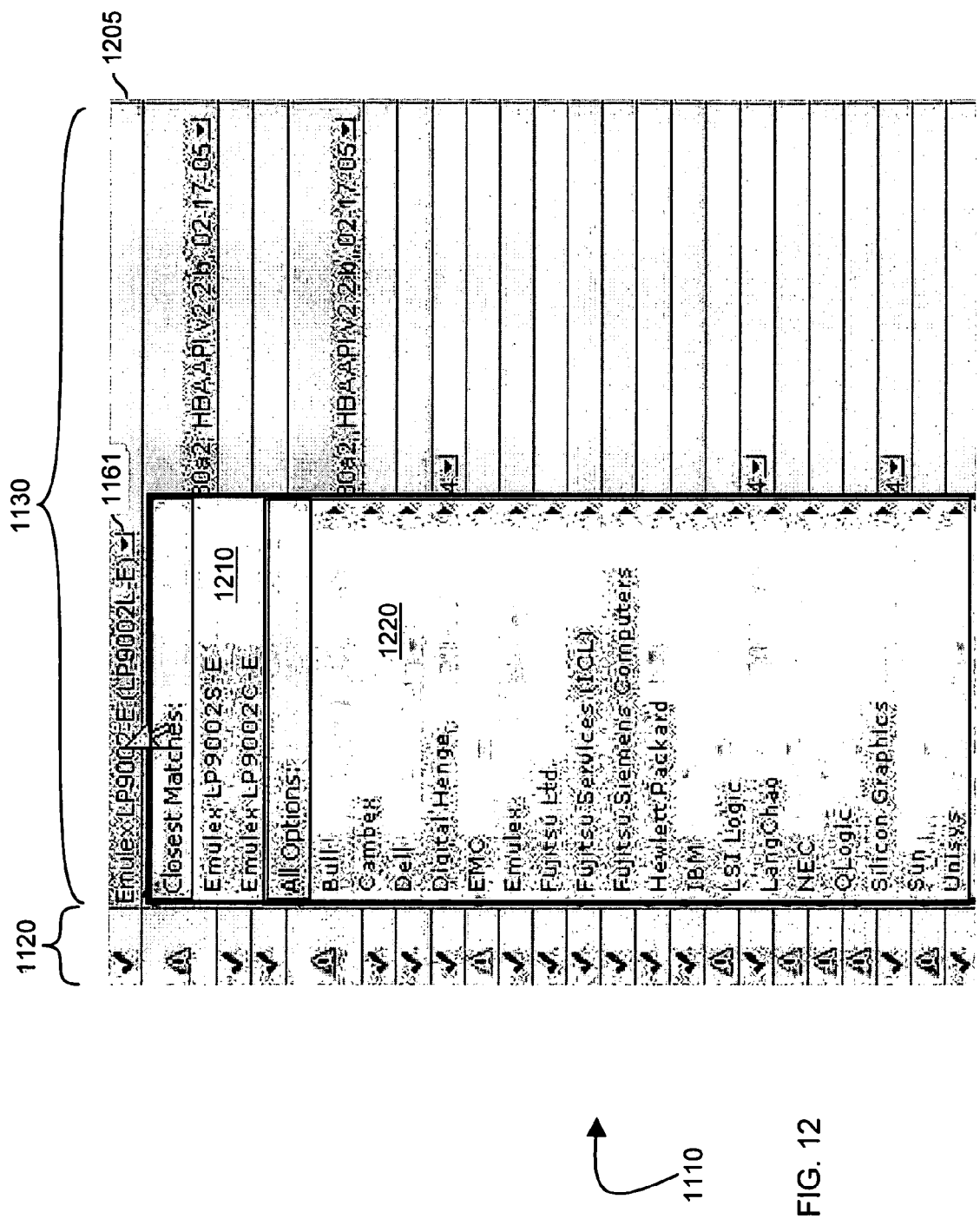
FIG. 12 is a sample screenshot of a display screen illustrating a technique for displaying a listing of closest matching types of resources according to an embodiment herein.

FIG. 12 is a sample screenshot 1200 of display screen 130 including a graphical user interface enabling a respective user 108 to review mappings and corresponding information according to an embodiment herein. As shown, table 1110 includes a column 1130 of type identifiers assigned by the mapping function 140 to multiple storage area network resources. Note that certain storage area network resources in column 1130 have not been assigned a respective type identifier.

Column 1120 includes symbols indicating whether respective storage area network resources have been mapped to corresponding type identifiers with a sufficient level of certainty. For example, a respective check mark in column 1120 indicates that the storage area network resource in row 1205 of table 1110 has been mapped to a respective type identifier Emulex LP9002-E™. Upon selection of symbol 1161, a display function initiates display of closest matching type identifiers (as shown in display region 1210 and display region 1220) for a particular unknown type of storage area network resource. In one embodiment, the respective user 108 can assign a type identifier to the storage area network resource by selecting one of the multiple entries in display region 1210. Display region 1220 enables a respective user 108 to view and select type identifiers associated with other known type of storage area network resources on a vendor by vendor and model by model basis.

Figure 13:
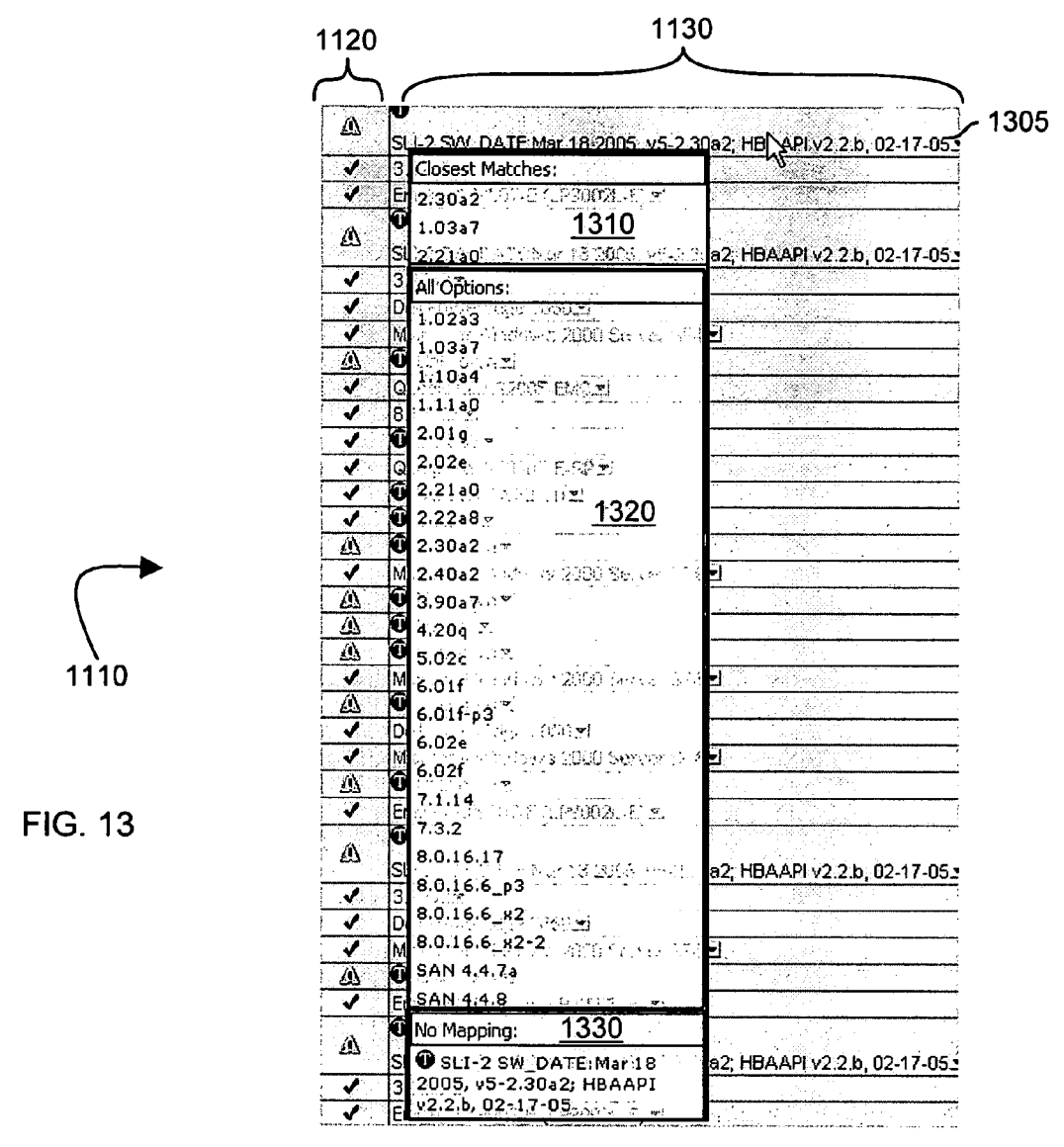

FIG. 13 is a sample screenshot 1300 of display screen 130 including a graphical user interface enabling a respective user 108 to review mappings and corresponding information according to an embodiment herein. As shown, table 1110 includes a column 1130 of type identifiers assigned to multiple storage area network resources. Certain storage area network resources in column 1130 have not been assigned a respective type identifier. Column 1120 includes symbols indicating whether respective storage area network resources have been mapped to corresponding type identifiers with a sufficient level of certainty as previously discussed. For example, the mapping function 140 has not provided any type identifier value for the storage area network resource associated with entry 1305 of table 1110. For this entry 1305, the user 108 can initiate display of a pull-down menu (e.g., a compilation of display region 1310, display region 1320, and display region 1330) to manually initiate assignment of a type identifier. Display region 1310 indicates closest matching string information associated with the corresponding unknown type of storage area network resource and other known types of storage area network resources. In this example, the user can select one of the closest matching strings in display region 1310 to assign the unknown type of storage area network resource to a respective selected known type of storage area network resource associated with the selected string.

In addition to displaying closest matching information in display region 1310, the mapping function can initiate display of all possible matching information in display region 1320. Display region 1330 displays the raw data collected or associated with an unknown type of storage area network resource.

Display of information in a respective pull-down menu enables a respective user 108 to compare the raw data associated with an unknown type of storage area network resource and compare it to known data strings associated with known types of storage area network resources. In certain cases, the user 108 is able to make a better decision as to proper type identifier assignments than the mapping function 140.

As discussed above, techniques herein are well suited for use in applications such as those that support mapping or conversion functions. However, it should be noted that configurations herein are not limited to such use and thus configurations herein and deviations thereof are well suited for use in other environments as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:
   receiving, at a processor device in a computer, information indicating attributes associated with an unknown type of storage area network resource;
   performing a comparison of the information associated with the unknown type of storage area network resource and a set of characteristic information associated with corresponding known types of storage area network resources; and
   based on the comparison, mapping the unknown type of storage area network resource to at least one specific identifier of a corresponding known type of storage area network resource;
   wherein performing the comparison includes: utilizing a description of functional attributes associated with the unknown type of storage area network resource to identify an actual type associated with the unknown type of storage area network resource; and wherein utilizing the description of functional attributes further comprises:

comparing the functional attributes associated with the unknown type of storage area network resource with a range of possible functional attributes associated with a given one of the corresponding known types of storage area network resources; and in response to detecting that the unknown storage area network resource has corresponding functional attributes outside the range of possible functional attributes associated with the given one of the corresponding known types of storage area network resources, eliminating a possibility that the unknown storage area network resource is a same type as the given one of the corresponding known storage area network resources.

2. A method as in claim 1 further comprising:

mapping the unknown type of storage area network resource to multiple corresponding known types of storage area network resources;

presenting multiple identifiers associated with the multiple corresponding known types of storage area network resources on a display screen for viewing by a user; and enabling the user to select and assign one of the multiple identifiers as a type associated with the unknown type of storage area network resource.

3. A method as in claim 1, wherein mapping the unknown type of storage area network resource includes detecting which of multiple types of storage area network resources have corresponding characteristic information that most closely matches the information associated with the unknown type of storage area network resource, the method further comprising:

presenting identifiers of the multiple types of storage area network resources on a display screen for viewing by a user;

receiving selection of a particular identifier of the presented identifiers; and assigning the particular identifier to the unknown type of storage area network resource to indicate that the unknown type of storage area network resource is of a known type as specified by the particular identifier.

4. A method as in claim 1, wherein receiving the information associated with the unknown type of storage area network resource includes receiving a data string generated by the unknown type of storage area network resource.

5. A method as in claim 4, wherein mapping the unknown type of storage area network resource includes:

matching the received data string to a corresponding data string associated with a corresponding particular known type of storage area network resource.

6. A method comprising:

receiving, at a processor device in a computer, information indicating attributes associated with an unknown type of storage area network resource;

performing a comparison of the information associated with the unknown type of storage area network resource and a set of characteristic information associated with corresponding known types of storage area network resources;

based on the comparison, mapping the unknown type of storage area network resource to at least one specific identifier of a corresponding known type of storage area network resource;

wherein receiving the information associated with the unknown type of storage area network resource includes receiving a data string generated by the unknown type of storage area network resource;

wherein mapping the unknown type of storage area network resource includes: matching the received data string to a corresponding data string associated with a corresponding particular known type of storage area network resource; and based on commonality between the received data string and the corresponding data string associated with the corresponding particular known type of storage area network resource, providing an indication that the unknown type of storage area network resource is of a same type as the corresponding particular known type of storage area network resource even though the data string generated by the unknown type of storage area network resource fails to include enough attribute information to positively indicate that the unknown type of storage area network is definitively a same type as the corresponding particular known type of storage area network resource.

7. A method as in claim 1, wherein receiving the information includes receiving data originated by the unknown type of storage area network resource, the received data indicating vendor information and model information associated with the unknown type of storage area network resource.

8. A method as in claim 7, wherein performing the comparison includes attempting to match the unknown type of storage area network resource to a known type of storage area network resource, the method further comprising:

in response to failing to identify the unknown type of storage area network resource as a certain match to a specific type of known storage area network resource based on the vendor information and model information, utilizing physical attributes associated with the unknown type of storage area network resource to narrow a number of possible matches of the unknown type of storage area network resource to an actual type of known storage area network resource.

9. A method as in claim 1, wherein performing the comparison includes:

identifying, via communications with the unknown type of storage area network resource, physical attributes associated with the unknown type of storage area network resource; and utilizing the physical attributes to convert the unknown type of storage area network resource into a respective known type of storage area network resource.

10. A method as in claim 1, wherein receiving the information associated with the unknown type of storage area network resource includes receiving a data string generated by the unknown storage area network resource, the method further comprising:

initiating a test to identify a longest sequence of matching characters between the received data string and each of multiple respective data strings associated with the known types of storage area network resources;

for a corresponding type of known storage area network resource having a respective data string that produces the longest sequence of matching characters in common with the received data string, providing an indication that the unknown type of storage area network resource is most likely a same type as the corresponding type of known storage area network resource.

11. A method as in claim 1 further comprising:

initiating a test to identify matching characters between a particular data string of information associated with the unknown type of storage area network resource and each of multiple respective data strings associated with the corresponding known types of storage area network resources; and for a respective known type of storage area network resource having an associated data string that produces a greatest number of matching characters with the particular data string, providing an indication that the unknown type of storage area network resource is most likely a same type as the respective known type of storage area network resource.

12. A method as in claim 1 further comprising:

initiating display of a type identifier value indicating a deduced type associated with the unknown type of storage area network resource; and initiating display of an indicator indicating that the type identifier value is a best guess of a respective type associated with the unknown type of storage area network resource.

13. A method as in claim 1 further comprising:

initiating display of an indicator indicating that the unknown type of storage area network resource has not been successfully mapped to a respective known type of storage area network resource; and based on selection of the indicator, initiating display of a listing of closest matching common data string information between the unknown type of storage area network resource and each of at least two different types of known storage area network resources.

14. A computer program product including a computer-readable, non-transitory storage medium having instructions stored thereon for processing data information, such that the instructions, when carried out by a processing device, enable the processing device to perform the steps of:

receiving information indicating attributes associated with an unknown type of storage area network resource;

performing a comparison of the information associated with the unknown type of storage area network resource and a set of characteristic information associated with corresponding known types of storage area network resources; and based on the comparison, mapping the unknown type of storage area network resource to at least one specific identifier of a corresponding known type of storage area network resource;

wherein performing the comparing includes: utilizing a description of functional attributes associated with the unknown type of storage area network resource to identify an actual type associated with the unknown type of storage area network resource; and wherein utilizing the description of functional attributes further comprises:

comparing the functional attributes associated with the unknown type of storage area network resource with a range of possible functional attributes associated with a given one of the corresponding known types of storage area network resources; and in response to detecting that the unknown storage area network resource has corresponding functional attributes outside the range of possible functional attributes associated with the given one of the corresponding known types of storage area network resources, eliminating a possibility that the unknown storage area network resource is a same type as the given one of the corresponding known storage area network resources.

15. A computer program product as in claim 14, wherein performing the comparison includes attempting to match the unknown type of storage area network resource to a known type of storage area network resource, the instructions enabling the processing device to further perform steps of:

in response to failing to identify the unknown type of storage area network resource as a certain match to a specific type of known storage area network resource based on the vendor information and model information, utilizing physical attributes associated with the unknown type of storage area network resource to narrow a number of possible matches of the unknown type of storage area network resource to an actual type of known storage area network resource.

16. A computer program product as in claim 14, wherein the instructions enable the processing device to further perform steps of:

based on commonality between a received data string associated with the unknown type of storage area network resource and a corresponding data string associated with a corresponding particular known type of storage area network resource, providing an indication that the unknown type of storage area network resource is of a same type as the corresponding particular known type of storage area network resource even though the data string generated by the unknown type of storage area network resource fails to include enough attribute information to positively indicate that the unknown type of storage area network is definitively the same type as the corresponding particular known type of storage area network resource.

17. A computer program product as in claim 14 further supporting operations of:

detecting which of multiple known types of storage area network resources have corresponding characteristic information that most closely matches the information associated with the unknown type of storage area network;

based on the comparison, mapping the unknown type of storage area network resource to multiple identifiers of corresponding known types of storage area network resources; and enabling a respective user to assign a type associated with the unknown type of storage area network resource by:

i) presenting the multiple identifiers associated with the multiple corresponding known types of storage area network resources on a display screen for viewing by a user, and ii) enabling the user to select and assign one of the corresponding multiple identifiers as a type associated with the unknown type of storage area network resource.

18. The method as in claim 1 further comprising:

receiving, from the unknown type of storage area network, a data string of information associated with the unknown type of storage area network resource;

based on a failure of attempting to map the unknown type of storage area network resource to a known type of storage area network resource based on use of the data string, utilizing a description of physical attributes associated with the unknown type of storage area network resource to attempt to identify an actual type associated with the unknown type of storage area network resource;

responsive to detecting that the unknown type of storage area network resource cannot be mapped to a respective known type of storage area network resource above a threshold of certainty using the physical attributes, initiating a test to identify a longest sequence of matching characters between the data string received from the unknown type of storage area network resource and each of multiple respective data strings associated with the corresponding known types of storage area network resources; and for a corresponding type of known storage area network resource having a respective data string that produces the longest sequence of matching characters in common with the received data string, providing an indication that the unknown type of storage area network resource is most likely a same type as the corresponding type of known storage area network resource.

19. The method as in claim 1 further comprising:

receiving physical attribute information indicating physical attributes associated with the unknown type of storage area network resource;

comparing the physical attribute information with a range of possible physical attributes associated with a given one of multiple known types of storage area network resources; and in response to detecting that the unknown storage area network resource has corresponding physical attributes outside the range of possible physical attributes, eliminating a possibility that the unknown type of storage area network resource is of a same type as the given one of the multiple known types of storage area network resources.

20. The method as in claim 1 further comprising:

receiving data originated by the unknown type of storage area network resource, the received data indicating vendor information and model information associated with the unknown type of storage area network resource;

attempting to match the unknown type of storage area network resource to a known type of storage area network resource based on the data;

in response to failing to identify the unknown type of storage area network resource as a certain match to a specific type of known storage area network resource based on the vendor information and model information, attempting to utilize physical attributes associated with the unknown type of storage area network resource to narrow a number of possible matches of the unknown type of storage area network resource to an actual type of known storage area network resource;

responsive to detecting that the unknown type of storage area network resource cannot be mapped with certainty to a corresponding known type of storage area network resource based on physical attribute information, attempting to match the received data string to a corresponding data string associated with a corresponding particular known type of storage area network resource;

based on matching of characters between the received data string and the corresponding data string associated with the corresponding particular known type of storage area network resource, displaying an indication that the unknown type of storage area network resource is one of multiple different types of storage area network resources; and receiving, from a user, selection of a particular storage area network resource from the multiple different types of storage area network resources, the selection indicating that the unknown type of storage area network resource is of a same type as the particular storage area network resource.

* * * * *